United States Patent [19]

Neff et al.

[11] Patent Number: 5,340,865
[45] Date of Patent: Aug. 23, 1994

[54] CROSS-LINKED CATIONIC POLYERMIC MICROPARTICLES

[75] Inventors: Roger E. Neff, Stamford; Roderick G. Ryles, Milford, both of Conn.

[73] Assignee: Cytec Technology Corp., Wilmington, Del.

[21] Appl. No.: 71,821

[22] Filed: Jun. 7, 1993

Related U.S. Application Data

[63] Continuation of Ser. No. 883,996, May 18, 1992, abandoned, which is a continuation of Ser. No. 286,015, Dec. 19, 1988, abandoned.

[51] Int. Cl.$^5$ ................................................ C08F 2/32
[52] U.S. Cl. ...................................... 524/317; 524/815; 524/829; 524/922
[58] Field of Search .............. 514/829, 814, 815, 922, 514/317; 210/734, 723

[56] References Cited

U.S. PATENT DOCUMENTS

5,110,864  5/1992  Robinson et al. .................... 524/829

FOREIGN PATENT DOCUMENTS

88/10274  12/1988  PCT Int'l Appl. .

Primary Examiner—Joseph L. Schofer
Assistant Examiner—Jeffrey T. Smith
Attorney, Agent, or Firm—Frank M. Van Riet

[57] ABSTRACT

Novel compositions comprising cationic polymeric microparticles are disclosed, along with a method for their production. The products are useful in flocculating a wide variety of dispersions of suspended solids.

5 Claims, No Drawings

CROSS-LINKED CATIONIC POLYERMIC MICROPARTICLES

This is a continuation of co-pending application Ser. No. 07/883,996 filed on May 18, 1992, now abandoned which, in turn, is a continuation of Ser. No. 07/286,015, filed Dec. 19, 1988 now abandoned.

The present invention relates to cross-linked, cationic polymeric microparticles and a method for their preparation. The present invention also relates to the use of the polymers as a flocculating agent.

BACKGROUND OF THE INVENTION

Cross-linked, cationic, polymeric compositions are known to those skilled in the art and are useful, after having been subjected to high shearing to render them soluble, in a variety of solid-liquid separation applications, particularly in the flocculation of various dispersions of suspended solids, such as sewage sludge, and in the thickening of cellulosic paper pulp suspensions. Modern concerns about environmental pollution and the increasing cost of materials useful therein have made it highly desirable to produce flocculating agents winch cause higher degrees of separation at lower dosage levels.

EP 0,202,780 describes the preparation of cross-linked, cationic, polyacrylamide beads by conventional inverse emulsion polymerization techniques. Crosslinking is accomplished by the incorporation of a difunctional monomer, such as methylenebisacrylamide, into the polymer chain. This cross-linking technology is well known in the art. The patentee teaches that the cross-linked beads are useful as flocculants but are more highly efficient after having been subjected to unusual levels of shearing action in order to render them water-soluble.

Typically, the particle size of polymers prepared by conventional, inverse, water-in-oil, emulsion, polymerization processes are limited to a range of 1–5 microns, since no particular advantage in reducing the particle size has hitherto been apparent. The particle size which is achievable in inverse emulsions is determined by the concentration and activity of the surfactant(s) employed and these are customarily chosen on the basis of emulsion stability and economic factors.

Leong, et al., in *Inverse Microemulsion Polymerization*, J. of Phys. Chem., Vol. 86, No. 23, 6-24-82, pp 2271–3, discloses polymerization of acrylamide in an inverse microemulsion. The authors also disclose having prepared a cross-linked polyacrylamide latex or microgel by using a 100:1 mixture of acrylamide-methylenebisacrylamide. No use of a cationic monomer is mentioned or of the possible use of the resultant product as a flocculating agent.

The present invention describes the preparation of a novel class of cationic, cross-linked, polymeric, microparticle flocculants. The new polymers are prepared by the optimal use of a variety of high activity surfactant or surfactant mixtures to achieve submicroparticle size. Preferably, the type and concentration of surfactant should be chosen to yield a particle size of less than about 0.5 micron in diameter and more preferably less than about 0.1 micron. Unexpectedly, the novel polymers of this invention are useful in flocculating applications without the necessity of being subjected to high and unusual levels of shearing action and surprisingly show improved performance over the prior art cationic flocculants prepared by conventional inverse emulsion polymerization. The products of this invention, when used as flocculating agents, cause high degrees of separation at low dosage levels thus satisfying both environmental and economical concerns and therefore constituting a significant advancement in the state of the art.

SUMMARY OF THE INVENTION

According to the present invention, there is provided compositions comprising cross-linked, cationic, polymeric microparticles, the microparticles having an unswollen number average particle size diameter of less than about 0.5 micron, preferably less than about 0.1 micron, a solution viscosity of from about 1.2 to about 1.8 mPa.s and a cross-linking agent content of above about 4 molar parts per million, based on the monomeric units present in the polymer.

Preferred features of the present invention comprise compositions, as defined above, wherein the cross-linking agent content ranges from about 4 to about 2000 molar parts per million, preferably from about 10 to about 1000 molar parts per million and even more preferably from about 50 to about 500 molar parts per million.

The preferred cross-linking agents comprise difunctional monomers selected from N,N'-methylenebisacrylamide; N,N'-methylenebismethacrylamide; polyethyleneglycol diacrylate; polyethyleneglycol dimethacrylate; N-vinylacrylamide; glycidyl acrylate; divinylbenzene; acrolein; glyoxal; diepoxy compounds; epichlorohydrin; or mixtures of any of the foregoing. Especially preferred is N,N'-methylenebisacrylamide.

The preferred cationic monomers for use in the practice of the present invention comprise ethylenically unsaturated monomers selected from acryloxyethyltrimethylammonium chloride; diallyldimethylammonium chloride; 3-methacrylamidopropyltrimethylammonium chloride; 3-acrylamidopropyltrimethylammonium-2-hydroxypropylacrylate methosulfate; trimethylammoniumethyl methacrylate methosulfate; 1-trimethylammonium-2hydroxypropylmethacrylate methosulfate; methacryloxyethyltrimethylammonium chloride; or mixtures of any of the foregoing. Especially preferred are acryloxyethyltrimethylammonium chloride, methacrylamidopropyltrimethylammonium chloride, diallyl dimethylammonium chloride and mixtures thereof.

Also contemplated by the present invention are compositions comprising cationic monomers copolymerized with ethylenically unsaturated non-ionic monomers selected from acrylamide; methacrylamide; N,N-dialkylacrylamides; N-alkylacrylamides; N-vinylmethacitamide, N-vinyl methylformamide; vinyl acetate; N-vinyl pyrrolidone and mixtures thereof. Especially preferred is acrylamide copolymerized with acryloxyethyltrimethylammonium chloride.

Also, according to the present invention there are provided processes for the preparation of compositions as defined above, the process comprising:

(a) admixing
   (i) an aqueous solution comprising at least one ethylenically unsaturated cationic monomer and at least one cross-linking agent and, optionally, at least one ethylenically unsaturated non-ionic monomer;
   (ii) an oil comprising at least one hydrocarbon liquid; and (iii) an effective amount of surfactant or surfactant mixture, so as to form an inverse emulsion which, when subjected to polymerization conditions, results in a polymer having a particle size of less than about 0.5 micron in unswollen diameter; and (b) subjecting the inverse emulsion obtained in step (a) to polymerization conditions.

A preferred feature of the present invention, comprises a process employing an aqueous solution comprising acryloxyethyltrimethylammonium chloride salt as the cationic monomer, methylenebisacrylamide as the cross-linking agent and acrylamide as the non-ionic monomer; an oil comprising a saturated hydrocarbon; and an effective amount of a surfactant comprising an ethoxylated lauryl ether; a polyoxyethylene sorbitan hexaoleate; a sorbitan sesquioleate; the oleate of diethanolamine or mixtures thereof sufficient to produce particles of less than about 0.5 micron in unswollen number average particle size diameter.

Polymerization of the inverse emulsion may be carried out by adding a polymerization initiator, such as sodium metabisulfite or tert-butyl hydroperoxide, or by subjecting the inverse emulsion to ultraviolet irradiation. Also contemplated by the present invention is adding an effective amount of chain-transfer agent to the aqueous solution of the inverse emulsion, such as an alcohol; a mercaptan; a phosphite; a sulfite or a mixture of any of the foregoing. The process of the present invention may also comprise a step for recovering the composition from the inverse emulsion.

DETAILED DESCRIPTION OF THE INVENTION

Cross-linked, cationic, polymeric microparticles having an unswollen number average particle size diameter of less than about 0.5 micron, a solution viscosity of from about 1.2 to about 1.8 mPa.s and a cross-linking agent content of above about 4 molar parts per million based on the monomeric units present in the polymer are generally formed by the polymerization of at least one ethylenically unsaturated cationic monomer and, optionally, at least one non-ionic comonomer in the presence of a cross-linking agent in a water-in-oil inverse emulsion employing an effective amount of surfactant or surfactant mixture.

Cationic monomers useful in the practice of this invention include diallyldimethylammmonium chloride; acryloxyethyltrimethylammonium chloride; (meth)acrylates of dialkylaminoalkyl compounds, and salts and quaternaries thereof and, in particular, monomers of N,N-dialkylaminoalkyl(meth)acrylamides, and salts and quaternaries thereof, such as N,N-dimethylaminoethylacrylamides; (meth)acrylamidopropyltrimethylammonium chloride and the acid or quaternary salts of N,N-dimethylaminoethylacrylate and the like. Cationic monomers which may be used herein are of the following general formulae:

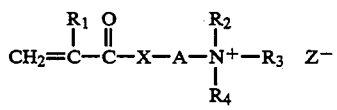

where $R_1$ is hydrogen or methyl, $R_2$ is hydrogen or lower alkyl of $C_1$ to $C_4$, $R_3$ and/or $R_4$ are hydrogen, alkyl of $C_1$ to $C_{12}$ aryl, or hydroxyethyl and $R_2$ and $R_3$ or $R_2$ and $R_4$ can combine to form a cyclic ring containing one or more hetero atoms, Z is the conjugate base of an acid, X is oxygen or $-NR_1$ wherein $R_1$ is as defined above, and A is an alkylene group of $C_1$ to $C_{12}$; or

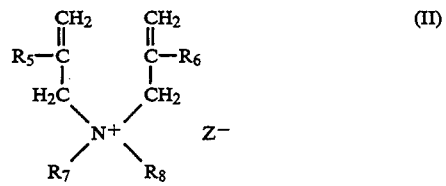

where $R_5$ and $R_6$ are hydrogen or methyl, $R_7$ is hydrogen or alkyl of $C_1$ to $C_{12}$ and $R_8$ is hydrogen, alkyl of $C_1$ to $C_{12}$, benzyl or hydroxyethyl; and Z is as defined above.

Non-ionic monomers, suitable for use in the practice of this invention generally comprise acrylamide; methacrylamide; N-alkyacrylamides, such as N-methylacrylamide; N,N-dialkylacrylamides, such as N,N-dimethylacrylamide; methyl acrylate; methyl methacrylate; acrylonitrile; N-vinyl methylacetamide; N-vinyl methyl formamide; vinyl acetate; N-vinyl pyrrolidone, mixtures of any of the foregoing and the like.

These ethylenically unsaturated, cationic and non-ionic monomers may be copolymerized to produce cationic copolymers. Preferably, acrylamide is copolymerized with a cationic monomer. Cationic copolymers useful in the practice of this invention comprise from about 0 to about 99 parts, by weight, of non-ionic monomer and from about 100 to about 1 part, by weight, of cationic monomer based on the weight of the cationic and non-ionic monomers taken together, preferably from about 40 to about 99 parts, by weight, of non-ionic monomer and about 1 to about 60 parts, by weight, of cationic monomer, same basis. Polymerization of the monomers occurs in the presence of a polyfunctional cross-linking agent to form the cross-linked composition. The polyfunctional cross-linking agent comprises molecules having either at least two double bonds, a double bond and a reactive group, or two reactive groups. Illustrative of those containing at least two double bonds are N,N-methylenebisacrylamide; N,N-methylenebismethacrylamide; polyethyleneglycol diacrylate; polyethyleneglycol dimethacrylate; N-vinyl acrylamide; divinylbenzene; triallylammonium salts, N-methylallylacrylamide and the like. Polyfunctional branching agents containing at least one double bond and at least one reactive group include glycidyl acrylate; glycidyl methacrylate; acrolein; methylolacrylamide and the like. Polyfunctional branching agents containing at least two reactive groups include dialdehydes, such as glyoxal; diepoxy compounds; epichlorohydrin and the like.

Cross-linking agents are to be used in sufficient quantities to assure a cross-linked composition. Preferably at least about 4 molar parts per million of cross-linking agent based on the monomeric units present in the polymeric is employed to induce sufficient cross-linking and especially preferred is a cross-linking agent content of from about 4 to about 2000 molar parts per million.

One method of obtaining the polymeric microparticles of this invention is to polymerize the monomers in a microemulsion. Polymerization in microemulsions and inverse microemulsions is known to those skilled in this art. P. Speiser reported in 1976 and 1977 a process for making spherical "nanoparticles" with diameters less than 800° A by (1) solubilizing monomers, such as acrylamide and methylenebisacrylamide and other materials, such as drugs, in micelles and (2) polymerizing the monomers, see J. Pharm. Sa., 65(12), 1763 (1976) and U.S. Pat. No. 4,021,364. Both inverse water-in-oil and oil-in-water "nanoparticles" were prepared by this process. While not specifically called microemulsion polymerization by the author, this process does contain all the features which are currently used to define microemulsion polymerization. These reports also constitute the first examples of polymerization or acrylamide in a microemulsion. Since then, numerous publications reporting polymerization of hydrophobic monomers in the oil phase of microemulsions have appeared. See, for example, U.S. Pat. Nos. 4,521,317 and 4,681,912; Stoffer and Bone, J. Dispersion Sci. and Tech., 1(1), 37, 1980; and Atik and Thomas, J. Am. Chem. Soc., 103(14), 4279 (1981); and GB 2161492A.

The instant cationic microemulsion polymerization process is conducted by (i) preparing a monomer microemulsion by adding an aqueous solution of the monomers to a hydrocarbon liquid containing appropriate surfactant or surfactant mixture to form an inverse monomer microemulsion consisting of small aqueous droplets which, when polymerized, result in polymer particles of less than 0.5 micron in size, dispersed in the continuous oil phase and (ii) subjecting the monomer microemulsion to free radical polymerization.

In order to obtain an inverse microemulsion, it is generally necessary to use particular formulations whose main parameters are as follows: surfactant concentration, HLB of surfactant or surfactant mixture, temperature, nature of the organic phase and composition of the aqueous phase.

The aqueous phase comprises an aqueous mixture of the monomers, cationic and optional non-ionic, and the cross-linking agent, as defined above. The aqueous monomer mixture may also comprise such conventional additives as are desired. For example, the mixture may contain chelating agents to remove polymerization inhibitors, pH adjusters, initiators and other conventional additives.

Essential to the formation of the microemulsion, which may be defined as a swollen, transparent and thermodynamically stable emulsion comprising two liquids insoluble in each other and a surfactant, in which the micelles are 0.5 micron or less in diameter, is the selection of appropriate organic phase and surfactant.

The selection of the organic phase has a substantial effect on the minimum surfactant concentration necessary to obtain the inverse microemulsion. This organic phase may comprise of a hydrocarbon or hydrocarbon mixture. Saturated hydrocarbons or mixtures thereof are the most suitable in order to obtain inexpensive formulations. Typically, the organic phase will comprise benzene, toluene, fuel oil, kerosene, odorless mineral spirits and mixtures of any of the foregoing.

The ratio, by weight, of the amounts of aqueous and hydrocarbon phases is chosen as high as possible, so as to obtain, after polymerization, a microemulsion of high polymer content. Practically, this ratio may range, for example from about 0.5 to about 3:1, and usually approximates about 1:1, respectively.

The one or more surfactants are selected in order to obtain an HLB (Hydrophilic Lipophilic Balance) value ranging from about 8 to about 11. Outside this range, inverse microemulsions are not usually obtained. In addition to the appropriate HLB value, the concentration of surfactant must also be optimized, i.e. sufficient to form an inverse microemulsion. Too low a concentration of surfactant leads to inverse emulsions of the prior art and too high a concentrations results in undue costs. Typical surfactants useful in the practice of this invention, in addition to those specifically discussed above, may be anionic, cationic or non-ionic and may be selected from polyoxyethylene (20) sorbitan trioleate, sorbitan trioleate, sodium di-2-ethylhexylsulfosuccinate, oleamidopropyldimethylamine; sodium isostearyl-2-lactate and the like.

Polymerization of the microemulsion may be carried out in any manner known to those skilled in the art. Initiation may be effected with a variety of thermal and redox free-radical initiators including azo compounds, such as azobisisobutyronitrile; peroxides, such as t-butyl peroxide; organic compounds, such as potassium persulfate and redox couples, such as ferrous ammonium sulfate/ammonium persulfate. Polymerization may also be effected by photochemical irradiation processes, irradiation, or by ionizing radiation with a $^{60}Co$ source. Preparation of an aqueous product from the emulsion may be effected by inversion by adding it to water which may contain a breaker surfactant. Optionally, the polymer may be recovered from the emulsion by stripping or by adding the emulsion to a solvent which precipitates the polymer, e.g. isopropanol, filtering off the resultant solids, drying and redispersing in water.

The product of this invention is useful in facilitating a wide range of solid-liquid separation operations. The products of this invention may be used to dewater biologically treated suspensions, such as sewage and other municipal or industrial sludges; the drainage of cellulosic suspensions, such as those found in paper production, e.g, paper waste; and the settling and dewatering of various inorganic suspensions, e.g. refinery waste, coal waste, etc.

DESCRIPTION OF THE PREFERRED EMBODIMENTS

The following examples illustrate the present invention, They are not be construed to limit the claims in any manner whatsoever.

EXAMPLES 1-2

Emulsion Polymerization: Procedure Q

An aqueous phase containing 21.33 gm of acrylamide, 51.7 gms of a 75% acryloxyethyltrimethylammonium chloride solution, 0.07 gm of 10% diethylenetriamine pentaacetate (penta sodium salt), 0.7 gm of 1% t-butyl hydroperoxide and 0.06 gm of methylenebisacrylamide dissolved in 65.7 gms of deionized water is prepared. The pH is adjusted to 3.5 (±0.1). An oil phase composed of 8.4 gms of sorbitan sesquioleate, 51.6 gms of polyoxyethlene sorbitol hexaoleate dissolved in 170.0 gms of a low odor paraffin oil is prepared. The aqueous and oil phases are mixed together in an air tight polymerization reactor fitted with a nitrogen sparge tube, thermometer and activator addition tube. The resultant clear microemulsion is sparged with nitrogen for 30 minutes and the temperature is adjusted to 27.5° C. Gaseous sulfur dioxide activator is then added by bubbling nitrogen through a solution of sodium metabisulfite. The polymerization is allowed to exotherm to its maximum temperature (about 52° C.) and then cooled to 25° C.

Comparative Polymerization Procedure E

An aqueous phase is made by dissolving 87.0 gms of commercial, crystal acrylamide (AMD), 210.7 gms of a 75% acryloxyethyltrimethylammonium chloride (Q-9) solution, 4.1 gms of ammonium sulfate, 4.9 gms of a 5% ethylene diaminetetraacetic acid (disodium salt) solution, 0.245 gm (1000 wppm) of methylenebisacrylamide and 2.56 gms of t-butyl hydroperoxide into 189.3 gms of deionized water. The pH is adjusted to 3.5 (±0.1) with sulfuric acid.

The oil phase is made by dissolving 12.0 gms of sorbitan monooleate into 173.4 gms of a low odor paraffin oil.

The aqueous phase and oil phase are mixed together and homogenized until the particle size is in the 1.0 micron range.

The emulsion is then transferred to a one liter, three-necked, creased flask equipped with an agitator, nitrogen sparge tube, sodium metabisulfite activator feed line and a thermometer.

The emulsion is agitated, sparged with nitrogen and the temperature adjusted to 25° C. After the emulsion is sparged 30 minutes, 0.8% sodium metabisulfite (MBS) activator solution is added at a 0.028 ml/minute rate. The polymerization is allowed to exotherm and the temperature is controlled with ice water. When cooling is no longer needed, the 0.8% MBS activator solution/addition rate is increased and a heating mantle is used to maintain the temperature. The total polymerization time takes approximately 4 to 5 hours using 11 mls of MBS activator. The finished emulsion product is then cooled to 25° C.

Determination of Solution Viscosity

The solution viscosity is determined on a 0.1% active aqueous polymer solution. 5.84 gms of sodium chloride is added to 100 gm of the 0.1% solution and stirred slowly for 15 minutes. The viscosity of this solution is determined using a Model LVT Brookfield viscometer with UL adapter at 60 rpm, at 25° C. (±1° C.).

Free Drainage Test

A 0.2% polymer solution dosage is diluted to 50 ml with deionized water and mixed with 200 gms of sewage sludge using the tumbling method. The polymer and sludge are tumbled (end-to-end) in a 1 quart jar for 1.5 minutes at 45 rpm. The flocculated sludge is then poured onto a piece of belt press filter medium held in a 10.5 cm Buchner funnel. A timer is started at the beginning of pouring of the flocculated sludge onto the filter media. The volume of filtrate collected after 10 seconds is recorded.

The results along with compositional data are set forth in Table 1, below.

TABLE 1

| AMD:Q-9 60:40 COPOLYMERS | | | | |
|---|---|---|---|---|
| | Example | | | |
| | 1* | 2* | 1 | 2 |
| Process | E | E | Q | Q |
| MBA, wppm | 1,000 | 10,000 | 1,000 | 10,000 |
| mppm | 780 | 7,800 | 780 | 7,800 |
| Properties | | | | |
| S.V., mPa·s | 1.24 | 1.09 | 1.3 | 1.2 |
| Particle diameter (microns) | 1.02 | 2.09 | 0.073 | 0.069 |
| Drainage, ml/10 sec | | | | |
| 11.2, lbs/ton | 86 | — | 178 | 82 |
| 22.4, lbs/ton | 120 | 83 | 162 | 112 |
| 33.6, lbs/ton | 138 | 90 | — | 116 |
| 44.8, lbs/ton | 167 | 116 | 165 | 123 |
| 56.0, lbs/ton | — | 128 | 174 | 126 |

*Control Sample
MBA = methylenebisacrylamide
wppm = weight parts per million
mppm = molar parts per million
S.V. = solution viscosity
lb/ton = pounds of polymer per ton of dry sludge
Drainage = free drainage test on Stamford ½ sludge
E = Polymerization procedure E - as defined above
Q = Polymerization procedure Q - as defined above Table 1 sets forth a comparison of the performance and properties of cross-linked microbeads prepared by conventional emulsion polymerization (E) and by the use of high concentration of high activity surfactants (Q). The 0.1 percent solution viscosities in 1M NaCl (S.V.) are all shown to be close to that of water (=1 mPa.s), showing that little if any polymer is soluble. Table 1 clearly demonstrates that the average particle diameter (as determined by quasi-elastic light scattering) of the present invention is much smaller than that of the prior art. The products of this invention are surprisingly shown to be more effective flocculants, resulting in a higher volume of free drainages at equivalent or lower dose levels.

EXAMPLES 3-6

The procedure of Example 1 is repeated varying the type and quantity of surfactant employed. The polymers are tested for sludge dewatering and their performance is compared with that of a commercial cationic flocculant of the same charge.

The apparatus and test procedures used in sludge dewatering tests of the resulting polymers are as follows: The apparatus comprises a 12 ounce Mason Ball Jar, a mixer equipped with a variable speed motor fitted with a double T-bar glass impeller and two sets of one-half inch wide blades, 2¼ inches in diameter offset 90°, set ½ inch apart (ACE Catalog No. 8068-18), and a filter press simulator.

A predetermined amount of polymer is diluted to 50 ml and 175 gms of sludge are conditioned therewith, mixing for one minute at 100 rpm and for 2 minutes at 50 rpm. The flocculated sludge is then poured into the funnel of the filter press. The volume of filtrate at 10 seconds is recorded. One minute after the flocculated sludge is placed in the funnel, a 33 pound weight is placed on the press plunger for four minutes. Note—the free water on the top filter cloth is removed with low vacuum. At the end of the press time, the sludge cake is removed, observations of sludge squeeze-by, cake release from filter cloth, and filter cloth cleanliness are recorded. The sludge cake is weighed "wet", then dried for 15 hours at 105° C., reweighed and percent cake solids determined. The results along with compositional information are set forth below in Table 2. The cake rating is a qualitative description of the physical properties of the cake, where a rating of 5 is the worst case, the cake being very sticky and difficult to remove from the filter press medium, thus resulting in a dirty filter. A rating of 0 represents the best case where the cake releases very easily from the press material leaving it clean with no residual particles of sludge.

TABLE 2

| | Example | | | | | | | | | |
|---|---|---|---|---|---|---|---|---|---|---|
| | 3* | 4A** | 4B** | 5A** | 5B** | 5C** | 3 | 4 | 5 | 6$^a$ |
| Surfactant System | — | A | A | — | — | — | P | — | — | — |
| Polymerization Procedure | — | E | E | Q | Q | Q | E | Q | Q | Q |
| MBA, wppm | 0 | 100 | 1000 | 0 | 100 | 10,000 | 100 | 250 | 1,000 | 250 |
| mppm | 0 | 78 | 780 | 0 | 78 | 7800 | 78 | 195 | 780 | 195 |
| Properties | | | | | | | | | | |
| S.V. mPa · s | 3.2 | 1.26 | 1.19 | 1.97 | 2.10 | 1.10 | 1.41 | 1.61 | 1.27 | 1.42 |
| Particle Size, m | — | — | 1.02[1] | 0.085[1] | 0.077[1] | R | 0.17[2] | R | R | R |
| Dose Range, lb/ton | 6.8–10.2 | 20.4–34.0 | 45.4–81.6 | 13.6–17.0 | 13.6–20.4 | 34.0–81.6 | 20.4–23.8 | 17.0–23.8 | 20.4–34.0 | 17.0–23.8 |
| Free Drainage Range, ml | 105–145 | 50–95 | 50–65 | 125–130 | 150–155 | 65 | 155 | 145–150 | 120 | 150 |
| Cake Solids Range, % | 12.8–14.3 | N | N | 14.5–15.1 | 18.1–18.6 | N | 18.4–19.3 | 17.4–18.3 | 17.3–18.1 | 17.4–18.7 |
| Cake Rating Range | 2–4 | N | N | 4 | 0–1 | N | 0 | 2–3 | 2 | 1 |

*Control Sample, Commercial Cationic Flocculant
**Control Samples
A = sorbitan monooleate
P = the oleate of diethanolamine, 8 percent
a = 1.0 percent isopropanol on batch added
1 = By quasi-elastic light spectroscopy (QELS)
2 = By transmission electron microscopy (TEM)
MBA = methylenebisacrylamide
wppm = weight parts per million
S.V. = solution viscosity
lb/ton = pounds of polymer per ton of sewage sludge
m = microns
mppm = molar parts per million
N = did not form a cake
R = visual appearance substantially identical to 5A and 5B

Table 2 shows that when a cross-linking agent, such as MBA, is incorporated into the polymer chain, insoluble particles, as evidenced by a low S.V., are formed. When a low activity surfactant, such as A, in Examples 4A and 4B, is employed, particles with an average diameter of 1.0 micron are formed. These particles perform very poorly, only flocculating solids at high dose levels. Even then, the strength of the resultant cake is not sufficient to provide efficient dewatering in the belt press simulation test wherein the cake is found to extrude through the belt. When high concentrations of high activity surfactant are employed, the P and Q systems, much smaller particles are obtained. In the absence of cross-linking agent, soluble products are formed, Example 5A**.

Example 5A** gives only a modest improvement in cake solids over the commercial flocculant. However, a significant improvement is observed when MBA is incorporated into the Q systems, Examples 4, 5 and 6, yielding high cake solids and a good cake rating. The cake rating is a measure of the ease with which the cake releases from the belt material. Note that chain-transfer agent, IPA, may be optionally employed with no detrimental effect, Example 6.

However, Example 5C**, having a high MBA concentration, gives a poor performance, showing the importance of the cross-linking agent concentration. Also, a particle with a small diameter size may be prepared with an alternative surfactant system, Example 3, and still result in excellent performance, thus showing performance to be a function of particle size and independent of the type of surfactant system employed to achieve a given particle size.

EXAMPLES 9–15

Example 1 is repeated, varying the surfactant type and concentration used. Results are set forth in Table 3, below.

TABLE 3

| | Examples | | | | | | | |
|---|---|---|---|---|---|---|---|---|
| | 9* | 9 | 10 | 11 | 12 | 13 | 14 | 15* |
| Systems | — | Q[1] | Q[1] | Q[1] | P[2] | P[3] | P[4] | A/E |
| MBA, wppm | 0 | 100 | 250 | 1000 | 100 | 100 | 100 | 100 |
| mppm | 0 | 78 | 195 | 780 | 78 | 78 | 78 | 78 |
| Properties | | | | | | | | |
| S.V., mPa · s | — | 1.72 | 1.44 | 1.29 | 1.21 | 1.21 | 1.41 | 1.24 |
| Particle Size, m | — | 0.078[5] | — | — | 0.72[5] | 0.19[5] | 0.17[6] | 1.0 |
| Dose Range, #/ton | 9.5 | 6.4–9.5 | 6.4–9.5 | 9.5 | 34.9 | 22.2 | 19.0 | 41.3 |
| Free Drainage, mls | 140 | 150–145 | 135–150 | 135 | 145 | 145 | 150 | 125 |
| Cake Solids, % | 17.7 | 21.7–22.0 | 21.8–22.0 | 22.0 | 19.4 | 21.8 | 20.8 | 15.5 |

TABLE 3-continued

| | Examples | | | | | | | |
|---|---|---|---|---|---|---|---|---|
| | 9* | 9 | 10 | 11 | 12 | 13 | 14 | 15* |
| Cake Rating | 3 | 0 | 2 | 3 | 0 | 0 | 0 | 3 |

*Control Sample - Commercial Cationic Flocculant
$Q^1$ = Same as procedure Q except that monomer solids are 51.9 percent on the aqueous phase. The polymerization temperature is kept between 40–50° C. using external cooling. The surfactant used is an ethoxylated (4 EOS) lauryl ether at 12.86 percent on total.
$p^2$ = Procedure P/E using 2% emulsifier with low homogenization time.
$p^3$ = Same as $p^2$ but with high homogenization time.
$p^4$ = Same as $p^3$ but with 8% emulsifier
5 = QELS
6 = TEM
SEE TABLES I AND II FOR REPEAT DESIGNATIONS.

AS shown in the Table 3, the 1 micron particles, Example 15*, prepared by conventional inverse, emulsion polymerization, did not perform as well as the control copolymers, giving lower cake solids at higher dose levels. However, higher cake solids are easily obtained using, as dewatering agents, cross-linked microparticles with dimensions below 1 micron, see Examples 9–14. Furthermore, the optimum dose level can be seen to decrease as the average particle size decreases. The most dramatic improvement in performance is found when the particle size is reduced to below 0.5 micron as shown by Example 12 as compared to Examples 13 and 14, where it can be seen that Example 14 performs as well as Example 12 at about one-half the dose level. Example 13 also performs at about half the dose level of Example 12, the only difference between the two being the quantity of mechanical energy used to generate the monomer emulsion. This difference results in the formation of microparticles with different average sizes and lends support to the theory that the observed reduction in the optimum dose can be ascribed solely to the reduction in particle size.

EXAMPLES 16–18

The procedure of Example 3 is repeated using 8.0 percent of the surfactant P system of Table 2, varying the MBA concentration slightly and employing other cationic monomers. The results are set forth in Table 4, below.

TABLE 4

| | Example | | |
|---|---|---|---|
| Composition | 16 | 17 | 18 |
| AMD, mole percent | 0 | 80 | 90 |
| Q-6, mole percent | 100 | 0 | 0 |
| MAPTAC, mole percent | 0 | 20 | 0 |
| DADM, mole percent | 0 | 0 | 10 |
| MBA, wppm | 100 | 105.5 | 132.7 |
| mppm | 135 | 70.8 | 69.05 |
| Property | | | |
| S.V., mPa · s | 1.41 | 1.53 | 1.43 |

AMD = acrylamide
Q-6 = methacryloxyethyltrimethylammonium chloride
MAPTAC = methacrylamidopropyltrimethylammonium chloride
DADM = diallyldimethylammonium chloride
MBA = methylenebisacrylamide
wppm = weight parts per million
S.V. = solution viscosity
mppm = molar parts per million Table 4, above, demonstrates that cationic copolymers or homopolymers of various cationic monomers may be prepared as within the scope of the appended claims.

EXAMPLES 19–25

The procedure of Example 1 is followed except various non-ionic ethylenically unsaturated monomers are used instead of acrylamide; 19) Methacrylamide, 20) N-methyl acrylamide, 21) N-methyl methacrylamide, 22) N,N-dimethylacrylamide, 23) N–vinyl methylformamide, 24) N-methylolacrylamide and 25) N-vinyl pyrrolidone are employed as the non-ionic monomer. Compositions comprising cross-linked, cationic, copolymeric microparticles are produced similar to those of Example 1.

EXAMPLE 26

The procedure of Example 1 is followed except polymerization is initiated by subjecting the inverse microemulsion to ultraviolet irradiation. A composition comprising insoluble, cross-linked, cationic, copolymeric microparticles is again formed.

EXAMPLES 27–35

The procedure of Example 1 is repeated except that different cross-linking agents are substituted for methylenebisacrylamide; 27) methylenebismethacrylamide, 28) Polyethyleneglycol dimethacrylate, 29) Polyethyleneglycol diacrylate, 30) N-vinyl acrylamide, 31) Glycidyl acrylate, 32) Divinyl benzene, 33) Acrolein, 34) Glyoxal and 35) Epichlorohydrin are employed as cross-linking agents. Compositions comprising cross-linked, cationic, copolymeric, microparticles are formed similar to those of Example 1.

EXAMPLE 36

The procedure of Example 1 is again followed, except that Q-9 is replaced by 1-acryloyl-4-methyl piperazine. Equivalent results are achieved.

The above mentioned patents and publications are incorporated herein by reference.

Many variations of the present invention will suggest themselves to those skilled in this art in light of the above detailed description. Chain-transfer agents may be optionally added to the monomer solution. Also contemplated are all methods of polymerization and dewatering processes.

All such obvious modifications are within the full intended scope of the appended claims.

We claim:

1. A flocculant comprising a water-in-oil emulsion comprising an oil phase and an aqueous phase wherein the oil phase consists of 1) fuel oil, kerosene, odorless mineral spirits or mixtures thereof and 2) one more surfactants at an overall HLB ranging from about 8 to 11 and the aqueous phase is in the form of micelles and contains a cross-linked, cationic, polymer produced from about 40 to about 99 parts, by weight, of acrylamide and about 1 to about 60 parts, by weight, of a cationic monomer selected from N,N-dialkylaminoalkylacrylates and methacrylates and their quaternary or acid salts; N,N-dialkylaminoalkylacrylamides and methacrylamides and their quaternary or acid salts and diallyldimethylammonium salts, said micelles having a diameter of less than about 0.1 micron, and said polymer having a solution viscosity of from about 1.2 to about 1.8 mPa.s and a content of N,N-methylenebisacrylamide of from about 10 molar parts to about 1000 molar parts per million, based on the monomeric units present in the polymer.

2. A flocculant as defined in claim 1 wherein said cationic monomer comprises acryloxyethyltrimethylammonium chloride; 3-methacrylamidopropyltrimethylammonium chloride; diallyldimethylammonium chloride or mixtures thereof.

3. A flocculant as defined in claim 1 wherein said cross-linking agent content ranges from about 50 to about 500 molar parts per million.

4. A flocculant as defined in claim 2 wherein said cationic monomer is acryloxyemhyltrimethyl ammonium chloride.

5. A flocculant as defined in claim 1 wherein said surfactant is polyoxyethylene sorbitol hexaoleate or a mixture thereof with sorbitan sesquioleate.

* * * * *